Figure 1:
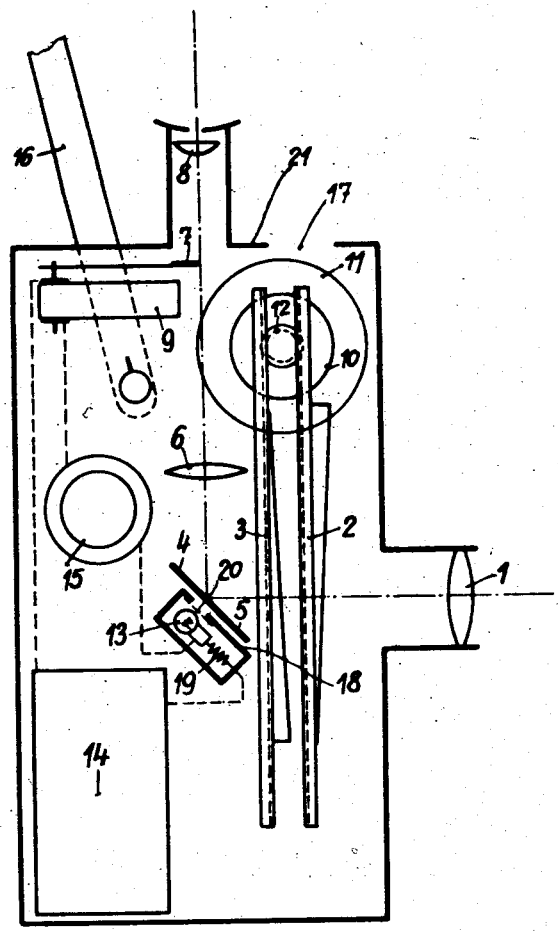

June 23, 1953   R. HASE   2,642,772
OPTICAL PYROMETER
Filed April 3, 1950

Inventor:
Rudolph Hase
by
Emery, Holcombe & Blair
Attorneys

Patented June 23, 1953

2,642,772

UNITED STATES PATENT OFFICE 2,642,772

OPTICAL PYROMETER

Rudolf Hase, Gehrden, near Hannover, Germany

Application April 3, 1950, Serial No. 153,605
In Germany December 14, 1949

1 Claim. (Cl. 88—22.5)

This invention relates to an optical pyrometer.

All optical pyrometers incorporate an arrangement proposed for the first time at the turn of the century, in which in the field of view a telescope or spectroscope compares the visible radiation of the body to be measured with a suitably provided standard light. The types of apparatus used in practice have retained until today their telescopic character, i. e. the device is held on a stand or tripod or usually in the hands, the observer's line of sight being directed on to the radiating object to be measured.

This method of measurement has various disadvantages, which are also common to all recent optical pyrometers.

Firstly, it interferes with the viewing if the telescope has to be held steady and horizontal with both hands in order not to lose sight of the object to be measured, which is often quite small, e. g. a furnace inspection aperture or the like. With the constrained, rigid, upright holding of the body which is necessary, the observer must concentrate his whole attention on the actual measuring operation, that is the production and judging of the equality of brilliance. The critical decision on which, in the last resort, accuracy in measurement depends, must be made by the eye. Particularly high requirements occur when, not only a "too bright" or "too dark" decision is to be made, as in the case of a monochromatic pyrometer, but, as in the case of a colour pyrometer additional adjustment must be made in respect of the similarity of the colours of the object to be measured and the field of comparison.

In this latter case it is necessary, not only to reduce the body tension to a minimum, but above all the retina of the eye must be protected from strong excitement. It has been shown by experiment that an observer, who before the measurement looks even for a few seconds into the red glow of a furnace, is not capable until some time after of observing fine colour variations in the field of vision of the instrument. In the hitherto usual telescopic form of optical pyrometer this eye dazzle certainly cannot be avoided except by the use of awkward anti-dazzle screens because the observer's line of sight is directed on to the radiating object.

All the above mentioned disadvantages are completely eliminated by the invention, according to which the path of radiation in the pyrometer is bent or deflected so that the direction of incidence of the light coming from the object to be measured forms an angle (preferably a right angle) with the observer's line of sight. Accordingly, the observer can look into the pyrometer from the top, perpendicularly to the plane of incidence of the light so that dazzle by the object to be measured is eliminated. At the same time the head can be held comfortably forward, and the remaining part of the body can be relaxed.

According to one constructional form of the invention the optical element (mirror, prism, or the like) which bends or deflects the light permits a comparison lamp arranged behind it in the line of sight to be visible as a mark.

According to a further constructional form of the invention the pointer of the milliammeter indicating the current strength of the lamp of the comparison field is placed in the field of view of the eyepiece, so that it remains under the constant control of the observer.

Hitherto it has been necessary for the eye to be removed from the eyepiece to read a scale, suitably disposed on the instrument, or even on an auxiliary device, but the invention permits concentration on the actual measuring operation to be maintained.

Further, the invention provides a fundamental improvement in the lamp illuminating the field of comparison. In previously known optical pyrometers this lamp is either supplied with a current strength which is measurable and adjustable, or which is kept strictly constant. But even in the last mentioned apparently simple case exchanging the lamp was a difficult matter, since even with the same strength and length of the Wolfram filament, any small deviations in the shape of the winding produce, with a similar current, variations in brilliance between the individual lamps. The problem becomes still more difficult when, as in the case of a colour pyrometer, it is in addition required to provide a similar colour. According to the invention the problem is solved firstly by connecting the lamp in a bridge circuit, since thereby the current indicator visible in the field of view is used only in a single position, namely in the zero position, and secondly by mounting the lamp in a sleeve which contains a resistance for the electrical comparison and one or more colour filters in front of the aperture therein for the optical comparison. In this way it is possible, as shown by experience, to make pyrometer lamps having the same resistance, the same brilliance and the same colour, and without loss to accuracy in measurement, as well as at the same time providing for replacing the lamp without again calibrating the pyrometer.

Figure 2:
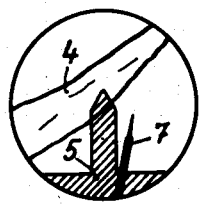

In the accompanying drawings Fig. 1 illustrates diagrammatically one constructional example of the invention, and Fig. 2 illustrates on a larger scale the field of view when measuring radiation from molten iron.

Referring to the drawings light coming from a body to be measured is brought by an objective 1, after passing through the two optical wedges 2 and 3 changing its brilliance and colour into the middle plane of the mirror 4—5, which deflects it through an angle of 90° from its original direction. The mirror silvering is, as shown in Fig. 2, in the form of a separate strip running out to a point, thereby providing a field of comparison 5, which is illuminated from the rear by a lamp 13. The latter is supplied by the battery 14 and can be kept at a constant brilliance by means of the rotary resistance 15 and the galvanometer 9. The comparison mark 5 and the image on the mirror 4—5 are now projected by the lens 6 into the plane of the pointer 7 and can be viewed through the eyepiece from the top of the instrument. In this way an observer's eye can see three things, namely an image of the object to be measured, the comparison mark and the current indicator. The only necessary operations consist in rotating the resistance knob 15 to bring the pointer 7 to the middle of the mark and then rotating the handle 10 to adjust the optical wedges 2 and 3 provided with notches or teeth in such a way that the comparison mark 5 and image 4 take up the same colour and the same brilliance. To this end a pinion 12 on the handle 10 has a small axial play by means of which it can be engaged in one of the two racks of the wedge frames. Two co-axial drums 11 disposed one behind the other are fixed to rotate in accordance with the movement of the wedges. They carry the scales for the black or the colour temperature and can be easily read through an aperture 17 disposed adjacent the eyepiece without rotating the knob or the instrument. The aperture 17 is arranged on the surface 21 of the pyrometer carrying the eyepiece.

The comparison lamp 13 is mounted in a sleeve 18 with an additional adjustable resistance 19. Light from the lamp passes outwards through an aperture covered with an interchangeable filter 20. The small device which is of very compact construction is carried on a strap 16 placed around the observer's neck. It requires no auxiliary apparatus such as a stand or tripod, or a battery box and provides a steady, reliable and dazzle-free measuring operation.

What I claim and desire to secure by Letters Patent is:

An optical pyrometer of the kind adapted to be held by the person carrying out a measurement comprising the combination of a casing having an eyepiece and an objective arranged at right angles to one another, means in said casing for deflecting light from the object to be measured incident on said objective into the line of sight from said eyepiece, a comparison light source comprising an electric lamp arranged behind said light deflecting means, and a needle galvanometer for indicating the strength of electric current passing through the lamp, the electric lamp galvanometer needle and object to be measured all being visible along the line of sight through the eyepiece; optical wedges disposed in the path of light passing through the objective, and slidable relatively to one another in parallel planes and means for slidably adjusting said optical wedges relatively to one another to vary the colour and brilliance of said light, scales and scale-carrying means operatively associated with said optical wedges, said scales being visible through an aperture provided in the casing at a point adjacent the eyepiece.

RUDOLF HASE.

References Cited in the file of this patent
UNITED STATES PATENTS

| Number | Name | Date |
| --- | --- | --- |
| 1,283,717 | Foote et al. | Nov. 5, 1918 |
| 1,762,380 | Bestelmeyer | June 10, 1930 |
| 1,825,229 | Hase | Sept. 29, 1931 |
| 1,908,977 | Gruss et al. | May 16, 1933 |
| 2,026,675 | Edwards | Jan. 7, 1936 |
| 2,049,260 | Hase | July 28, 1936 |
| 2,172,634 | Axtell | Sept. 12, 1939 |